(No Model.) 3 Sheets—Sheet 1.
F. BREYER.
FILTER, &c.
No. 444,483. Patented Jan. 13, 1891.
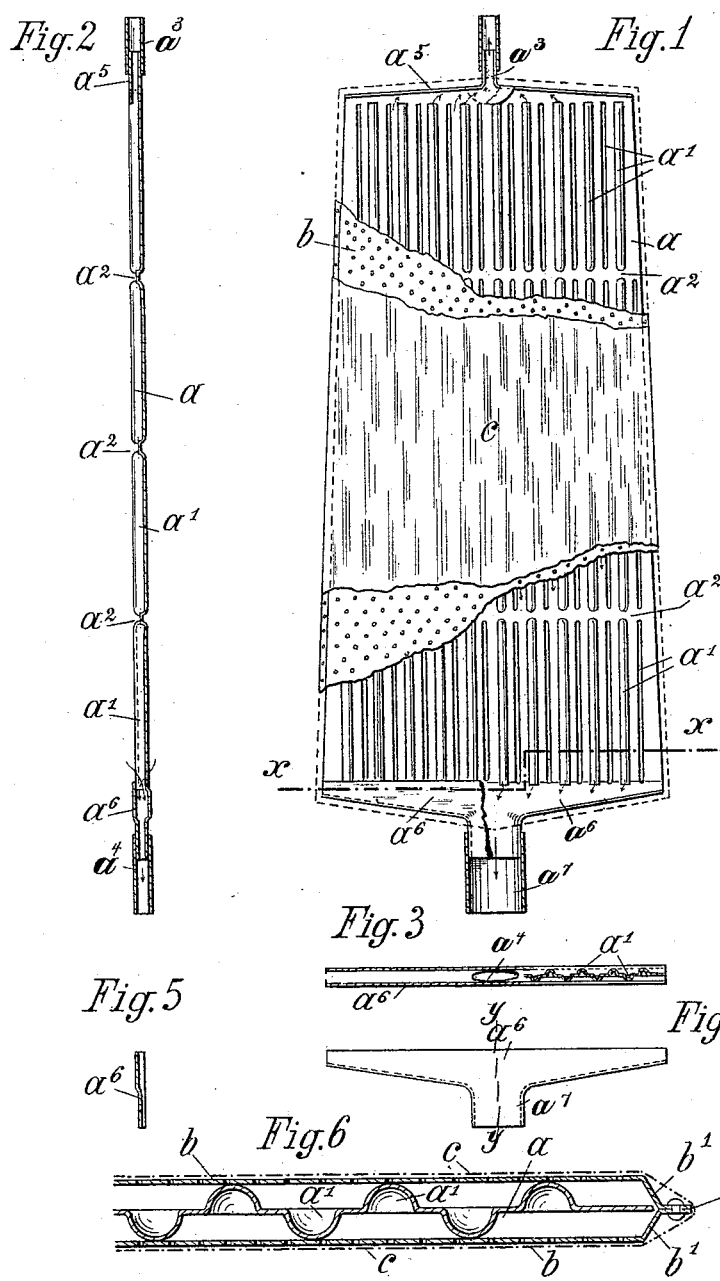
Witnesses:
J. Thomson Cross
Henry J. Dieterich
Inventor:
Friedrich Breyer
per Henry Orth
Attorney.

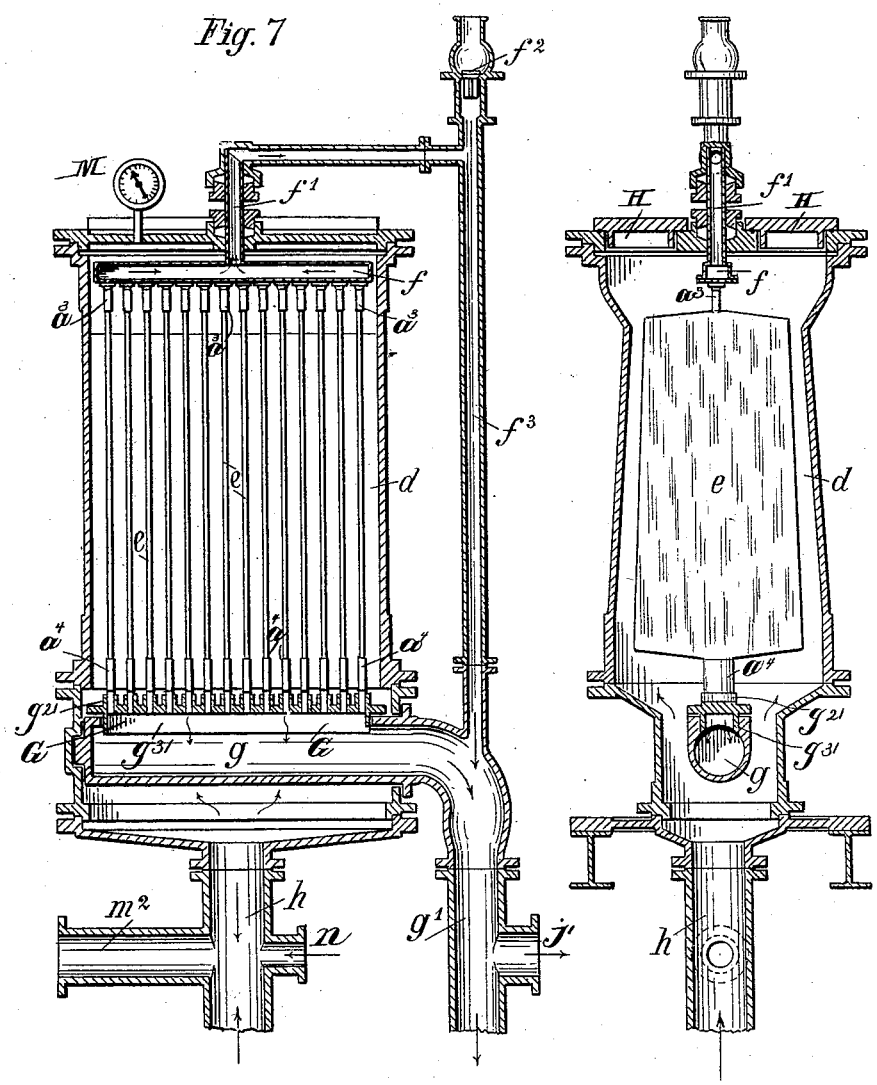

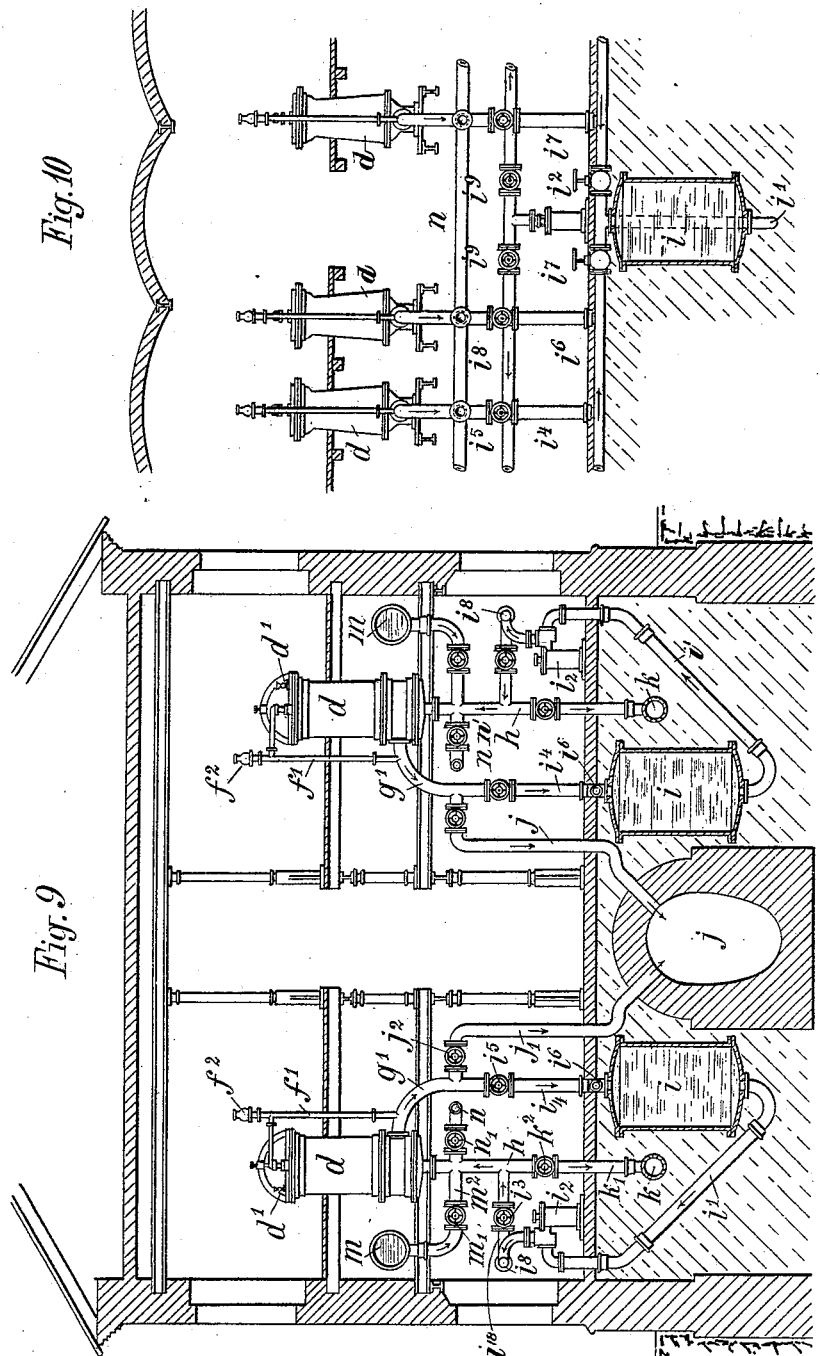

UNITED STATES PATENT OFFICE.

FRIEDRICH BREYER, OF VIENNA, AUSTRIA-HUNGARY.

FILTER, &c.

SPECIFICATION forming part of Letters Patent No. 444,483, dated January 13, 1891.

Application filed May 21, 1890. Serial No. 352,620. (No model.) Patented in Luxemburg April 8, 1890, No. 1,270.

*To all whom it may concern:*

Be it known that I, FRIEDRICH BREYER, engineer, a subject of the Emperor of Austria, residing at Vienna, in the Province of Lower Austria, in the Empire of Austria-Hungary, have invented certain new and useful Improvements in Asbestus Filters and Methods of Preparing the Same, (for which I obtained Letters Patent in Luxemburg, dated April 8, 1890, No. 1,270;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Referring to the drawings, Figure 1 is an elevation of a filtering element or medium constructed according to my invention, portions of said element being broken away and other portions shown in section to better illustrate its construction. Fig. 2 is a vertical axial section of the inner plate of the filtering element. Fig. 3 is a transverse section thereof on or about on line $x\,x$ of Fig. 1. Fig. 4 is a face view of the front plate of the lower portion of the inner plate of the filtering element. Fig. 5 is a section on line $y\,y$ of Fig. 4. Fig. 6 is a transverse sectional view, on an enlarged scale, of the inner plate and the perforated inclosing plates thereof of the filtering element. Figs. 7 and 8 are vertical axial sections, taken at right angles to each other, of a filter constructed according to my invention. Fig. 9 is a vertical sectional elevation of a filtering plant; and Fig. 10 is a like view of a portion thereof, illustrating some of the connections.

The invention relates to the art of filtration, and particularly to the sterilizing filtration of fluids—that is to say, to the elimination from fluids of microscopic impurities held in solution or suspension, or microscopic vegetable or animal matter dangerous to health, such as fungi or the germs thereof, or microbes or spores, or animalculæ that cannot be removed by any of the filtering media usually employed—the object of the invention being to provide means whereby the sterlizing filtration may be carried out on any desired scale and in an effective and simple manner.

The invention has for its further object to provide a simple method of and means for producing filtering media or sterilizing filtering media of great simplicity and efficiency in operation.

The invention has for its further object in so constructing the filtering media and in so arranging said media in the filters as that the sterilizing filtering-surface when it becomes unserviceable may be readily regenerated without removing said media from the filter, if so desired.

To these ends the invention consists in the mode or process of preparing the sterilizing filtering media, in the construction of the filtering media or the sterilizing filtering media, in the combination of these media with the filter-casings, and in a filtering plant, as will now be fully described.

*The mode or process of preparing and constructing the filtering media.*—In the construction of the filtering media I employ a foundation or supporting plate $a$, of sheet metal, of any desired form and size, but preferably of a trapezoidal form, as shown in Figs. 1 and 8, said plate having alternate right and left hand corrugations or ribs $a'$, that not only form channels along which the filtrate flows, but also form supporting-ribs for the superstructural or superposed elements and add considerably to the strength of the filtering medium and enables it to resist considerable pressures. This supporting-plate $a$ is inclosed in a perforated jacket formed of perforated sheet-metal plates $b$, Figs. 1 and 6, that are riveted as near fluid-tight as possible at the sides and ends, the plates $b$ being bent over the plate $a$, as shown at $b'$, and the meeting edges $b^2$ riveted together, as shown at $b^2$, Fig. 6, this arrangement being also followed at the upper and lower ends of the plate $a$, the plates $b$ conforming to the outlet branches $a^3$ and $a^4$, respectively. In order to impart to the plate $a$ a greater transverse resistance, the longitudinal corrugations $a'$ are interrupted, the sections of corrugations being separated from each other by an intervening non-corrugated transverse portion $a^2$, Figs. 1 and 2. At the upper and lower ends of the plate $a$ are formed transverse channels or chambers $a^5$ and $a^6$, into which the channels formed by the corrugations $a'$ open, and midway of said chambers or channels $a^5$ $a^6$ are arranged or formed the outlet branches $a^3$ $a^4$, respectively, above referred to. Upon the sheet-metal plate $b$ is secured a textile fabric $c$, Fig. 1, also shown in dotted lines in Fig. 6, which is conveniently applied by sewing together at the sides and at the narrower ends two pieces of fabric of the form of the filter-plates $a\ b$, so as to form a bag, which is next drawn over the filter-plates $a\ b$, and the meeting edges at the wider end are then securely sewed together, the fabric being at the same time stretched as much as possible. I thus obtain a foraminous or porous filtering medium that is adapted for use in many branches of the arts for the filtration of fluids, and in practice the perforations in the plate $b$ are about one millimeter in diameter. Such filtering medium would, however, not answer for sterilizing filtration. No matter how dense the fabric $c$ may be, its meshes would still be too coarse to retain impurities of the nature of those hereinabove referred to.

To adapt such a filtering medium for the purposes last referred to, it is provided with an outer filtering stratum in the following manner: The fabric is first boiled for about one hour in water at a temperature of about 100° centigrade, then dried, and the outer surfaces roughened by means of a wire brush until a velvet-like nap is provided, when it is coated with an emulsion of asbestos applied with a brush over the entire surface of the fabric, as well as the seams and edges thereof. To this end all the seams should preferably be fell-seams, except that along the narrower end, which may be a very close overseam, and the asbestos coating should be applied as uniformly as a coat of paint. I thus obtain a filtering medium also adapted for many purposes in the arts in the filtration of fluids, the asbestos coating adhering firmly thereto, and forms a porous coating the meshes of which are infinitesimal as compared with those of the filtering media usually employed, especially when the asbestos emulsion is prepared as hereinafter described, yet a filtering medium so prepared is still of too coarse a mesh for sterilizing filtration. In order to still further reduce the meshes of the medium to adapt it for the last-named purpose I proceed as follows: The filtering medium so prepared is now ready to receive the final or sterilizing filtering coating of asbestos, which is obtained by depositing the finely-divided asbestos upon the coating of asbestos previously applied with a brush.

*The asbestos emulsion.*—I have discovered that asbestos can be reduced to a microscopic state by the application of cold, which seems to render the mineral fiber so brittle as that it can be broken up much more finely than it could be done otherwise. Availing myself of this discovery, I prepare the asbestos emulsion in the following manner: Wool-like fibrous asbestos, free from grit or stones, is first boiled in water and then allowed to cool, and is then exposed to a freezing temperature by artificial means or otherwise. The frozen mass is then crushed in any suitable crushing apparatus. The crushed material is again boiled, allowed to cool, and then frozen again. This frozen and already finely-crushed material is now ground so fine that when a little of it is mixed with water it will form an emulsion, which, as seen by the naked eye, is devoid of structure—that is to say, the fiber should be reduced to so fine a state as not to be visible. The object of boiling the ground asbestos is to sterilize the water used and loosening the fiber by dissolving soluble matter.

In the use of the emulsion for the final sterilizing coating of the filtering medium the proportion of dry asbestos should be carefully determined, and according to the proportion of dry asbestos in the ground material the emulsion is thinned out with water to such an extent as that it will contain about 0.3 gram of asbestos to every square decimeter of filtering area. The deposit of the final sterilizing coating may be effected in any desired manner, though I prefer to effect this in the filter itself. As shown in Figs. 7 and 8, a number of filtering media provided with a first coating of asbestos emulsion prepared as described are arranged in a filter-casing $d$, with their outlets $a^3$ opening into a chamber $f$, that is connected by a pipe $f'$ with a pipe $f^3$, in whose upper end, which is open to the atmosphere, is seated a gravity-valve $f^2$. The outlets $a^4$ extend into coupling branches $g^{21}$, formed on a flanged plate G, that is seated on the discharge-pipe $g$, the flange $g^{31}$ of said plate extending into the slot of said pipe $g$ to facilitate the removal of the filtering media $e$ whenever this becomes necessary. The pipe $f^3$ is connected with pipe $g$ and the latter by a branch $g'$ with the reservoir that contains the asbestos emulsion, said pipe $g'$ having a branch $j'$ for purposes hereinafter explained. The bottom of the filter-casing has a pipe $h$, provided with two branches $m^2$ and $n$, for purposes which will also be explained hereinafter. It is obvious that if the pipe $h$ is connected with a forcing apparatus—as, for instance, a force-pump—and said pump with the reservoir containing the asbestos emulsion, all the branch pipes being closed and the pump is set in operation, a circulation of the emulsion through the filter and the filtering media, the reservoir for the emulsion and the pump will be established, the asbestos being deposited upon the filtering media. This is continued until the pressure required to force the liquid through the media rises to about one and a half ($1\frac{1}{2}$) atmosphere above the normal atmospheric pressure, at which pressure the microscopically-reduced asbestos will adhere firmly to the coating of asbestos previously applied with a brush. In order to ascertain that the asbestos coating is of the proper density the filtering media are tested under air-pressure.

Experiments have demonstrated that an asbestus filtering medium having the property of sterilizing fluids by filtration will not admit of the passage therethrough of air at a pressure less than about one (1) or one and one-half (1½) atmosphere above the normal air-pressure. When this pressure is reached, the pump is stopped, and if on opening the valve $f^2$ the pressure within the filter does not fall one-tenth ($\frac{1}{10}$) of an atmosphere within thirty (30) seconds after the stoppage of the pump the filtering media are in proper condition for sterilizing filtration. I would remark here that the air-pressure test should not be applied except when the filtering media are wet.

The next operation consists in the final sterilizing of the filtering media by passing air heated to about 150° centigrade through the same, the vapors being allowed to escape by opening the check-valve $f^2$. Filtering media constructed and prepared as described may readily be regenerated when rendered inoperative by use, in that the adherent impurities and the outer asbestus coating are removed by means of brushes, and a fresh deposit of asbestus formed thereon.

In Figs. 9 and 10 I have shown a filter plant so constructed that not only the operation of filtering, but also the depositing of the sterilizing filter coating, the testing of such coating, and the sterilizing of the same, may be effected, as well as the regenerating of the filtering media, without removing them from their casings, to which end said filtering media are so arranged within their casings as to admit of the introduction of a brush or brushes through the hand or man holes H, Fig. 8, for the purpose of removing the adherent impurities and the sterilizing coating of asbestus.

*The plant.*—I will now describe the plant and its operation, referring to Fig. 9. The pipe $g'$ is connected by pipe $i^4$ to the reservoir $i$, that contains the asbestus emulsion, a valve $i^5$ being interposed in said connections. Said pipe $g'$, as above stated, has a branch $j'$, that is in communication with a duct $j$, that receives the filtrate, said branch $j'$ being provided with a valve or stop-cock $j^2$. The branch $m^2$ of pipe $h$ is connected with the duct $m$, that supplies the fluid to be filtered, and by a branch $i^{18}$ with a pipe $i^3$, and through the latter with the pump $i^2$, said pump $i^2$ being also connected with the reservoir $i$ at the bottom thereof, the branches $m^2$ and $i^3$ of pipe $h$ being respectively provided with suitable valves or stop-cocks $m'$ and $i^3$. The branch $n$ of pipe $h$ is connected with any suitable source of hot-air supply, and is provided with a valve or stop-cock $n'$, while the pipe $h$ is connected through pipe $k'$ with a duct $k$ for the eduction of the impurities eliminated from the fluid by filtration.

In Fig. 9 I have shown a battery of filters arranged on opposite sides of the duct $j$ for the reception of the filtrate, each battery having a single pump, the branches $i^{18}$ of the pipes $h$ of the filters of a battery being connected by a common pipe $i^3$ with said pump. Each battery has also a common emulsion-reservoir connected with pipe $i^6$ and through the branches $i^4$ with the pipes $g'$ of the filters of a battery. As shown in Fig. 10, two stop-cocks or valves $i^7 i^7$ and $i^9 i^9$ are interposed in the pipes $i^6$ and $i^8$, one on each side of the reservoir $i$ and pump $i^2$, respectively, a hot-air-supply pipe $n^2$, common to all the pipes $h$, being also used, as shown in said Fig. 10, the branches $n$ of pipes $h$ being provided with suitable stop-cocks or valves $n'$, as hereinabove referred to.

I will now describe the operation of depositing the sterilizing filter coating upon the filtering media prepared and arranged within the filter-casing, as above set forth in reference to Figs. 7 and 8, or upon filtering media from which the sterilizing coating has been removed, as set forth, for the purpose of regenerating the said media and the sterilizing of said coating. The reservoir $i$ being supplied with asbestus emulsion, the stop-cocks or valves $j^2$, $n'$, $m'$, and $k^2$ are closed, and the stop-cocks or valves $i^3$ and $i^5$ are opened, as well as the air-escape cock or valve $d'$, Fig. 9. The pump is now started, and the emulsion drawn from reservoir $i$ through pipe $i'$ by the pump $i^2$ is forced through pipe $i^3$, branch $i^{18}$, and pipe $h$ into the filter-casing $d$ until the emulsion commences to flow out of the air-cock $d'$, when the latter is closed. The water of the emulsion now percolates through the filtering media and flows into pipes $g$ and $g'$ back to reservoir 8. This circulation is kept up until the manometer M, Fig. 7, on the filter-casing $d$ indicates a pressure therein of about one and one-half (1½) atmosphere above normal pressure. When the operation of the pump is stopped, the valve $i^3$ is closed, while the valve $k^2$ is opened to empty the contents of the filter into the duct $k$, that receives the impurities. The density of the filtering media is now tested, as hereinabove set forth. To this end the valves $k^2$ and $i^5$ are closed, the communication between the pump $i^2$ and reservoir $i$ cut off, and communication between the outer atmosphere and said pump established, and air is pumped into the filter $d$ until the check-valve $f^2$ is lifted, and the air blows off, when the manometer M should indicate a pressure of from one (1) to one and one-half (1½) atmosphere above normal air-pressure, and if the operation of the pump is now stopped the pressure during the first thirty (30) seconds, or thereabout, should not fall more than one-tenth ($\frac{1}{10}$) of an atmosphere. If this is the case, the filtering media are in proper condition for sterilizing filtration, as hereinbefore mentioned.

The next operation consists in the sterilizing of the filtering media, for which purpose the check-valve $f^2$ is opened and air heated to about 150° centigrade is forced through pipes $n\ h$ into the filter $d$ and around the filtering media, the vapors generated within the filtering media and the air escaping through the port of the check-valve $f^2$. The filter is now ready for sterilizing filtration, all the valves except those $m'$ and $j^2$ being closed, and said valve $m'$ is so adjusted that the filtration of the fluid from reservoir or conduit $m$ will proceed under a pressure of from one (1) to one and a half ($1\frac{1}{2}$) atmosphere.

I have deemed it unnecessary to show the connection between the pump $i^2$ and the atmosphere and the means for cutting off the communication between the pump and the reservoir $i$, as any skilled mechanic will be enabled to provide the means and make the necessary arrangements to that effect.

If desired, the air for the air-pressure test may be introduced or forced into the filter through the hot-air pipe, suitable connections and cut-off valves being provided between the apparatus for forcing hot-air through said pipe $n$, the source of hot-air supply and the source of atmospheric-air supply, and any skilled mechanic will also be able to provide and make the necessary arrangements to that effect.

Having now described my invention, what I claim, and desire to secure by Letters Patent, is—

1. A filtering medium consisting of a supporting-plate provided with alternate right and left hand corrugations and a foraminous jacket, in combination with a channel at opposite ends of the medium in communication with the corrugations of the supporting-plate and an outlet branch for said channels, substantially as set forth.

2. A filtering medium consisting of a supporting-plate provided with alternate right and left hand corrugations and a foraminous jacket composed of perforated sheet metal and a textile envelope, in combination with a channel at opposite ends of the medium in communication with the corrugations of the supporting-plate and an outlet branch for said channels, substantially as set forth.

3. A filtering medium consisting of a supporting-plate provided with alternate right and left hand corrugations and a foraminous jacket composed of perforated sheet metal and a textile envelope provided with an outer coating of finely-divided asbestos, in combination with a channel at opposite ends of the medium in communication with the corrugations of the supporting-plate and an outlet branch for said channels, substantially as set forth.

4. A filtering medium consisting of a supporting-plate provided with alternate right and left hand corrugations and intervening non-corrugated portions at right angles to the corrugations and a foraminous jacket, in combination with a channel at opposite ends of the medium in communication with the corrugations of the supporting-plate, substantially as set forth.

5. In the preparation of filtering media for sterilizing filtration, the mode of subdividing the asbestos, which consists in mixing the asbestos with water, freezing the mixture, and then reducing the same, as set forth.

6. In the preparation of filtering media for sterilizing filtration, the mode of subdividing the asbestos, which consists in subjecting a mixture thereof with water to alternate boiling and freezing temperatures and subdividing while in a frozen condition, as set forth.

7. A sterilizing filtering plant comprising a filter provided with a plurality of chambered filtering media arranged vertically therein, outlet-pipes in communication with the interior of the filtering media, a connection between said outlet-pipes, said connection having a branch opening to the atmosphere, a check-valve opening outwardly and seated in said branch, a receiver for the filtrate and a receiver for the asbestos emulsion connected with the outlet-pipes, suitable valves or stop-cocks in said connection, a valved supply-pipe connecting the filter-case with the receiver for the asbestos emulsion, a pump interposed in said supply-pipe, and a valved branch connecting the supply-pipe with the source of supply of the fluid to be filtered, said branch being interposed between the pump and filter, substantially as and for the purposes specified.

8. A sterilizing filtering plant comprising a filter provided with a plurality of chambered filtering media arranged vertically therein, outlet-pipes in communication with the interior of the filtering media, a connection between said outlet-pipes, said connection having a branch opening to the atmosphere, a check-valve opening outwardly and seated in said branch, a receiver for the filtrate and a receiver for the asbestos emulsion connected with the outlet-pipes, suitable valves or stop-cocks in said connections, a valved supply-pipe connecting the filter-case with the receiver for the asbestos emulsion, a pump interposed in said supply-pipe, a valved branch connecting the supply-pipe with the source of supply of the fluid to be filtered, said branch being interposed between the pump and filter, and a valved connection between the supply-pipe and a receiver for the impurities, substantially as and for the purposes specified.

9. A filtering plant comprising a filter-casing provided with a blow-off cock in its cover, a plurality of chambered filtering media arranged vertically in the casing, outlet-pipes in communication with the interior of the filtering media, a connection between said outlet-pipes, said connection having a branch opening to the atmosphere, a check-valve opening outwardly and seated in said branch, a receiver for the filtrate and a receiver for the asbestos emulsion connected with the outlet-pipes, suitable valves or stop-cocks in said connections, a valved supply-pipe connecting the filter-case with the receiver for the asbestos emulsion, a pump interposed in said supply-pipe, a valved branch connecting the supply-pipe with the source of supply of the fluid to be filtered, said branch being interposed between the pump and filter, and a valved duct connecting the supply-pipe with a source of air-supply, said duct being also interposed in the supply-pipe between the pump and filter, substantially as and for the purposes specified.

10. A filter comprising a filter-casing, a chamber $f$, arranged in the upper end of the casing, an outlet-pipe connected with said chamber, a discharge-pipe at the lower end of the filter, a plurality of chambered filtering media arranged vertically within the filter-casing, the chambers thereof being in communication with upper chamber $f$ and the discharge-pipe, respectively, and a supply branch $h$, opening into the bottom of the filter, substantially as and for the purposes specified.

11. A filter comprising a casing $d$, the chambers $f$ in the upper part of the casing, the outlet-pipe $g$ in the lower part of said casing, a series of chambered filtering media having their chambers connected with the casing $f$ and pipe $g$, respectively, a pipe $f'$ $f^3$, connecting the pipe $g$ with the upper chamber $f$, said pipe having a branch open to the atmosphere, a check-valve $f^2$ in said branch, and a supply-pipe $h$, connected with the filter-casing at the bottom thereof, substantially as and for the purposes specified.

12. A filter comprising a casing $d$, provided with a blow-off cock and pressure-gage, the chambers $f$ in the upper part of the casing, the outlet-pipe $g$ in the lower part of said casing, a series of chambered filtering media having their chambers connected with the casing $f$ and pipe $g$, respectively, a pipe $f'$ $f^3$, connecting the pipe $g$ with the upper chamber $f$, said pipe having a branch open to the atmosphere, a check-valve $f^2$ in said branch, and a supply-pipe $h$, connected with the filter-casing at the bottom thereof, substantially as and for the purposes specified.

In testimony whereof I affix my signature in presence of two witnesses.

FRIEDRICH BREYER.

Witnesses:
NETTIE S. HARRIS,
JOSEF LEHETNER.